(12) United States Patent
Blanchard et al.

(10) Patent No.: US 8,768,599 B2
(45) Date of Patent: Jul. 1, 2014

(54) SYSTEM AND METHOD FOR ENGINE AND FUEL SYSTEM MAINTENANCE

(75) Inventors: John P. Blanchard, Holly, MI (US); Scott J. Chynoweth, Davison, MI (US); Tameem K. Assaf, Milford, MI (US); Jacob S. Tretter, Commerce Township, MI (US); Constantine J. Sasaridis, Austin, TX (US); Michael A. Turley, Dexter, MI (US)

(73) Assignee: GM Global Technology Operations LLC

( * ) Notice: Subject to any disclaimer, the term of this patent is extended or adjusted under 35 U.S.C. 154(b) by 1111 days.

(21) Appl. No.: 12/761,862

(22) Filed: Apr. 16, 2010

(65) Prior Publication Data

US 2011/0066352 A1 Mar. 17, 2011

Related U.S. Application Data

(60) Provisional application No. 61/242,984, filed on Sep. 16, 2009.

(51) Int. Cl.
*B60W 10/06* (2006.01)
*B60W 20/00* (2006.01)

(52) U.S. Cl.
USPC .................. 701/102; 701/113; 180/65.28

(58) Field of Classification Search
USPC ............. 701/102, 113, 29.1, 29.2, 29.5, 31.4; 180/65.28
See application file for complete search history.

(56) References Cited

U.S. PATENT DOCUMENTS

| 4,426,980 | A | | 1/1984 | Eisele et al. ................. 123/478 |
|---|---|---|---|---|
| 4,495,918 | A | * | 1/1985 | Sugiura et al. ........... 123/406.16 |
| 4,847,768 | A | | 7/1989 | Schwartz et al. |
| 5,672,051 | A | | 9/1997 | Forgue et al. .............. 417/44.11 |
| 5,785,138 | A | | 7/1998 | Yoshida ................... 180/65.245 |
| 6,291,902 | B1 | * | 9/2001 | Ogane et al. .................... 290/34 |
| 6,342,027 | B1 | | 1/2002 | Suzuki ............................ 477/5 |
| 6,612,386 | B2 | * | 9/2003 | Tamai et al. .............. 180/65.25 |
| 6,695,895 | B2 | | 2/2004 | Hyodo et al. ................... 96/111 |

(Continued)

FOREIGN PATENT DOCUMENTS

| CN | 101234637 | | 8/2008 |
|---|---|---|---|
| JP | 10-331691 | | 12/1998 |
| WO | WO 2008062689 A1 | * | 5/2008 |
| WO | WO2008146900 | | 12/2008 |

OTHER PUBLICATIONS

E.D. Tate, Michael O. Harpster and Peter J. Savagian; SAE Technical Paper Series 2008-01-0458; "The Electrification of the Auomobile: From Conventional Hybrid, to Plug-in Hybrids, to Extended-Range Electric Vehicles"; Apr. 14-17, 2008; 11 pages.

(Continued)

*Primary Examiner* — Mahmoud Gimie
*Assistant Examiner* — David Hamaoui

(57) ABSTRACT

A control system for a vehicle includes a time determination module, a fuel age determination module, and an engine control module. The time determination module determines an engine off time, wherein the engine off time indicates an amount of time that an engine is off. The fuel age determination module determines an age of fuel in a fuel system of the engine. The engine control module starts the engine when one of the engine off time is greater than a predetermined time threshold and the age of the fuel is greater than a predetermined age threshold.

38 Claims, 5 Drawing Sheets

(56) References Cited

U.S. PATENT DOCUMENTS

| | | | |
|---|---|---|---|
| 6,897,629 B2 | 5/2005 | Wilton et al. | 318/139 |
| 6,935,311 B2 | 8/2005 | Visser et al. | 123/406.47 |
| 7,219,005 B2 | 5/2007 | Mazet | 701/104 |
| 7,471,003 B2 | 12/2008 | Kobayashi et al. | 290/40 C |
| 7,602,278 B2 * | 10/2009 | Prost-Fin et al. | 340/438 |
| 7,756,621 B2 * | 7/2010 | Pillar et al. | 701/41 |
| 7,980,342 B2 * | 7/2011 | Andri | 180/65.28 |
| 8,115,612 B2 * | 2/2012 | Hirano et al. | 340/438 |
| 8,177,006 B2 * | 5/2012 | Leone | 180/65.28 |
| 2003/0213292 A1 * | 11/2003 | Budeiri et al. | 73/118.1 |
| 2004/0046394 A1 | 3/2004 | Lim | 290/40 C |
| 2005/0074656 A1 | 4/2005 | Koyama et al. | 429/34 |
| 2005/0118468 A1 | 6/2005 | Adams et al. | 429/22 |
| 2006/0019135 A1 | 1/2006 | Curello et al. | 429/22 |
| 2006/0213186 A1 | 9/2006 | Pott | 60/285 |
| 2006/0231304 A1 | 10/2006 | Severinsky et al. | 180/65.2 |
| 2007/0093359 A1 | 4/2007 | Kobayashi et al. | 477/107 |
| 2007/0144175 A1 | 6/2007 | Sopko et al. | 60/605.1 |
| 2007/0234990 A1 | 10/2007 | Shiino et al. | 123/179.16 |
| 2007/0278021 A1 | 12/2007 | Pott et al. | 180/65.2 |
| 2008/0167788 A1 * | 7/2008 | Tate et al. | 701/104 |
| 2009/0294193 A1 * | 12/2009 | Okuno | 180/65.265 |
| 2013/0268182 A1 * | 10/2013 | Treharne et al. | 701/113 |

OTHER PUBLICATIONS

Claudia Veronica D'Ornellas, "The Effect of Ethanol on Gasoline Oxidation Stability", SAE Technical Paper 2001-01-3582, Reprinted from SI and Diesel Engine Performance and Fuel Effects SP-1645), Sep. 24-27, 2001, 9 pages.

Ernane Ribeiro Streva, Leonardo Vinicius Mendes Pereira and Jose Ricardo Sodre, Vanya Marcia Duarte Pasa, "Gasoline-Ethanol Blend Aging Effects on Engine Performance and Exhaust Emissions", SAE Technical Paper 2003-01-3184, 2003, 7 pages.

Howard L. Fang, David M. Stehouwer and Jerry C. Wang, "Interaction Between Fuel Additive and Oil Contaminant: (II) Its Impact on Fuel Stability and Filter Plugging Mechanism", SAE Technical Paper 2003-01-3140, 2003, pp. 1-10.

In-Sik Rhee, "Microbiogical Contamination in JP-8 Fuel", SAE Technical Paper 2005-01-1802, Reprinted from: Military Vehicle Technology (SP-1962), Apr. 11-14, 2005, 8 pages.

Itsuki Miyata, Yasunori Takei, Kazushi Tsurutani and Masanori Okada, "Effects of Bio-Fuels on Vehicle Performance: Degredation Mechanism Analysis of Bio-Fuels", SAE Technical Paper 2004-01-3031, Reprinted from Alternative and Oxygenated Fuels (SP-1897), 2004, 11 pages.

Leo L. Stavinoha, Steve Howell, "Potential Analytical Methods for Stability Testing of Biodiesel and Biodiesel Blends", SAE Technical Paper 1999-01-3520, 1999, pp. 1-15.

S.R. Reddy, "Evaporative Emissions from Gasolines and Alcohol-Containing Gasolines with Closley Matched Volatilites", 1987 Society of Automotive Engineers, Inc. p. 6.760-6.778.

* cited by examiner

US 8,768,599 B2

SYSTEM AND METHOD FOR ENGINE AND FUEL SYSTEM MAINTENANCE

CROSS-REFERENCE TO RELATED APPLICATIONS

This application claims the benefit of U.S. Provisional Application No. 61/242,984, filed on Sep. 16, 2009. The disclosure of the above application is incorporated herein by reference in its entirety.

FIELD

The present disclosure relates to engine control systems, and more particularly to a system and method for engine and fuel system maintenance in a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles may include both an internal combustion engine and an electric motor. The electric motor may be powered by a battery system. For example, the electric motor may be used to propel the vehicle at low speeds and the engine may be used to propel the vehicle at high speeds. Alternatively, the electric motor may be used to propel the vehicle until power in the battery system is exhausted. After the power in the battery system is exhausted, the engine may be used to propel the vehicle (i.e., a parallel hybrid vehicle) or to recharge the battery system (i.e., a series hybrid vehicle).

An extended-range electric vehicle (E-REV) is an example of a hybrid vehicle that may use the electric motor for propulsion (similar to an electric vehicle, or EV) until power in the battery system is exhausted. After power in the battery system is depleted, the E-REV may activate an internal combustion engine to power a generator that supplies current to the electric motor and/or recharges the battery system. In other words, the E-REV may achieve an extended range compared to traditional EV's (when the engine is used after depletion of the battery system). The E-REV, however, may also operate solely as an EV for certain distances in between recharging operations without activating the engine. The E-REV may then receive power from a wall outlet (such as in an owner's garage) to recharge the battery system.

SUMMARY

A control system for a vehicle includes a time determination module, a fuel age determination module, and an engine control module. The time determination module determines an engine off time, wherein the engine off time indicates an amount of time that an engine is off. The fuel age determination module determines an age of fuel in a fuel system of the engine. The engine control module starts the engine when one of the engine off time is greater than a predetermined time threshold and the age of the fuel is greater than a predetermined age threshold.

A method includes determining an engine off time, wherein the engine off time indicates an amount of time that an engine is off, determining an age of fuel in a fuel system of the engine, and starting the engine when one of the engine off time is greater than a predetermined time threshold and the age of the fuel is greater than a predetermined age threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
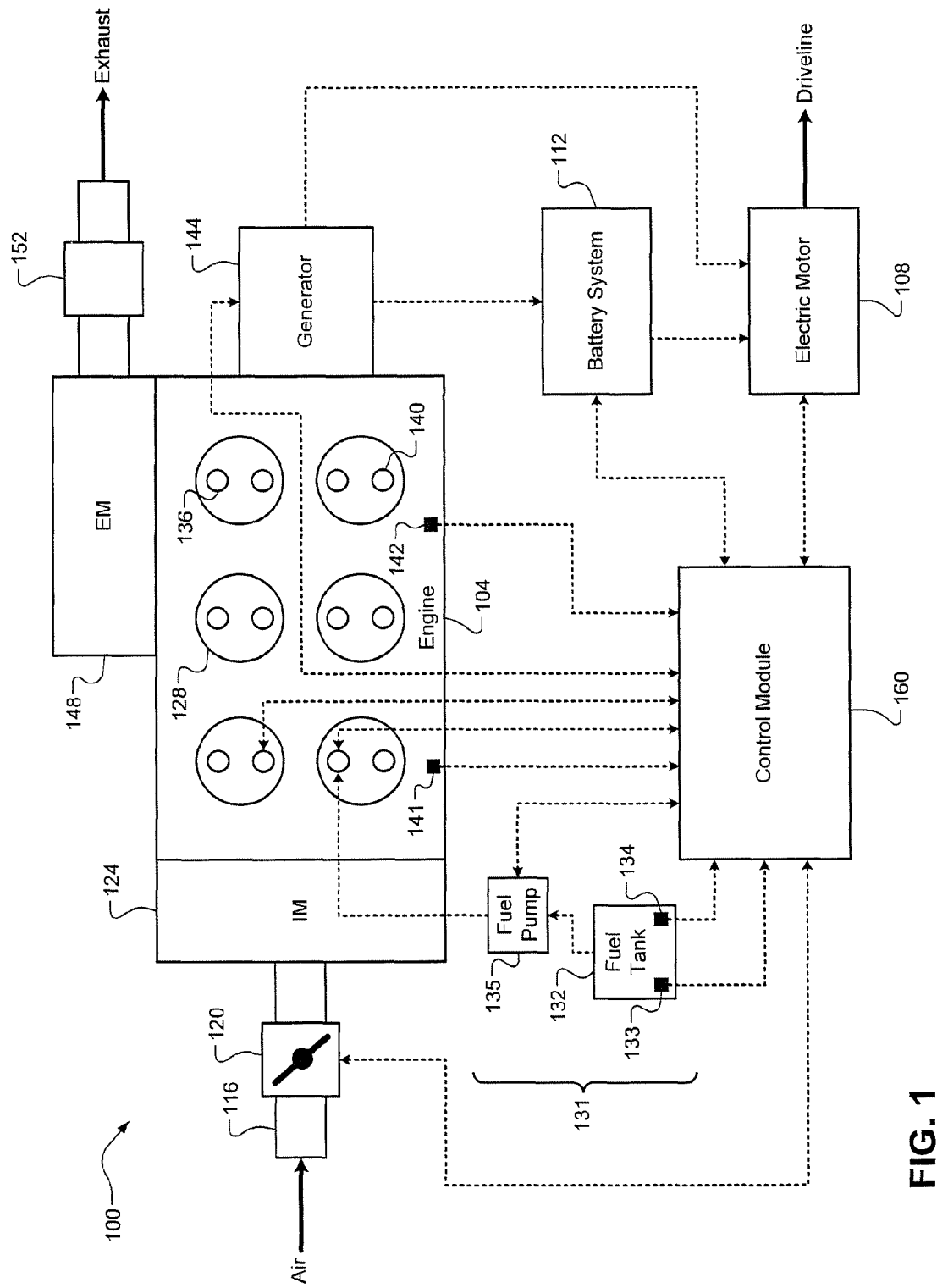
FIG. 1 is a functional block diagram of an exemplary hybrid engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An extended-range electric vehicle (E-REV) uses an electric motor for propulsion (similar to an electric vehicle, or EV) until power in a battery system is depleted. The E-REV may then activate an internal combustion engine to power a generator that supplies current to the electric motor and/or recharges the battery system. The battery system of the E-REV, however, may also be periodically recharged by plugging the E-REV into a wall outlet (such as in an owner's garage). The E-REV, therefore, may be operated for an extended period of time (e.g., weeks) without activating the engine. In other words, for example only, the PHEV may travel a short distance each day (e.g., a few miles to and from work) before being recharged each night. Thus, the engine may be off (i.e., inactive) for the extended period of time.

Lubrication of the engine may decrease when the engine is inactive for the extended period of time. For example, engine lubricants (e.g., oil) may evaporate, oxidize, thermally breakdown, or thicken (e.g., oil sludge). The decreased lubrication of the engine may increase friction between various engine components when the engine is running. The increased friction may damage the various engine components. Moreover, the decreased lubrication may prevent the engine from being started. Additionally, fuel weathering may occur in a fuel system when the engine is off for the extended period of time. More specifically, the fuel in the fuel system (i.e., fuel lines) may become congealed (i.e., more viscous). The congealed fuel in the fuel system may prevent the engine from being started.

Furthermore, running the engine for a short period of time without reaching ideal operating temperatures may cause engine oil to be contaminated with fuel and/or water. Specifically, contaminants may mix with the fuel when gases including combustion byproducts "blow by" a piston ring and mix with the engine oil in crankcase. When the engine is warm (i.e., at or above the ideal operating temperatures), these contaminants do not accumulate in the oil because they are expelled through a positive crankcase ventilation (PCV) system. When the engine is cold (i.e., below the ideal operating temperatures), however, the fuel is enriched due to a slower rate of vaporization, and the enriched fuel (i.e., lower A/F ratio) results in a higher chance of oil contamination.

Therefore, a system and method are presented for engine and fuel system maintenance. More specifically, the system and method monitor engine off time and fuel age to determine whether the engine should be started. In one embodiment, the system and method may determine the fuel age based on an amount of time since a refuel event and/or an ethanol content of the fuel. The system and method may detect and record a refuel event when a fuel level in a fuel tank increases more than a predetermined threshold. For example, a fuel level sensor may measure the fuel level in the fuel tank.

The system and method may send a request to a driver, and the driver may respond by either allowing or not allowing the engine to be started. When the driver approves the request (i.e., allows the engine start operation), the engine may run until a temperature of an engine fluid is greater than a predetermined temperature for a predetermined period. For example, the engine fluid may be engine coolant or engine oil. Additionally, the system and method may start the engine after the driver ignores or disapproves of the request for longer than a predetermined period after receiving the initial request. Moreover, the system and method may not start the engine (even when a request is approved or a start operation is forced) when the level of fuel in the fuel tank is less than a predetermined level. Similarly, the system and method may stop the engine (i.e., after a start operation) when the level of fuel in the fuel tank decreases below the predetermined level.

Referring now to FIG. 1, an exemplary hybrid engine system 100 of a vehicle is shown. For example only, the vehicle may be a PHEV or an extended-range electric vehicle (E-REV). The hybrid engine system 100 may include an internal combustion engine 104, an electric motor 108, and a battery system 112. For example, the engine 104 (via a generator 144) and/or the battery system 112 may supply the electric motor 108 with current to drive the electric motor 108 and propel the vehicle.

The engine 104 may draw air into an intake manifold 124 through an inlet 116 that may be regulated by a throttle 120. The air in the intake manifold 124 is distributed to a plurality of cylinders 128. However, while six cylinders are shown, the engine 104 may include other numbers of cylinders. The air distributed to each of the cylinders 128 may be combined with fuel to create an air/fuel (A/F) mixture.

The fuel may be supplied to the engine 104 by a fuel system 131 and a plurality of fuel injectors 136. For example, the fuel system 131 may include a fuel tank 132, a fuel level sensor 133, a fuel composition sensor 134, and a fuel pump 135. The fuel tank 132 stores fuel to be used by the engine 104. The fuel level sensor 133 may measure an amount of fuel in the fuel tank 132. The fuel composition sensor 134 may measure an ethanol content of the fuel in the fuel tank 132. The fuel pump 135 may supply pressurized fuel from the fuel tank 132 to the fuel injectors 136. In one embodiment, the fuel injectors 136 may inject fuel into intake ports of the cylinders 128, respectively (i.e., port fuel injection). Alternatively, as shown, each of the cylinders 128 may include a fuel injector 136 that injects fuel directly into the cylinder 128 (i.e., direct fuel injection).

A control module 160 may also include a plurality of failsafes if various fuel system sensors have faulted. First, for example, if one of an engine coolant sensor 141 and an engine oil sensor 142 has faulted then the control module 160 may run engine maintenance until a maximum calibration time expires as opposed to the time it takes to reach the desired operating temperature (e.g., $T_{coolant} + T_{offset}$). Additionally, for example, if the fuel level sensor 133 has faulted, the control module 160 may run engine or fuel maintenance with the fuel level fault, and thus the control module 160 may bypass (i.e., ignore) low fuel levels and increase fuel age as normal (but refuels may not be detected). Further, for example, if the fuel composition sensor 134 (not shown) has faulted then the control module may command a default fuel aging rate to 100% ethanol, effectively resulting in a maximum rate of fuel aging. Lastly, for example, if non-volatile memory (NVM) has faulted the control module 160 may set fuel age and engine off time to calibrated values such that time may not start accumulating from zero if the vehicle was very close to needing engine and/or fuel maintenance.

The A/F mixture in the cylinders 128 is compressed by pistons (not shown) and ignited by spark plugs 140. The combustion of the A/F mixture drives the pistons to rotatably turn a crankshaft (not shown). The engine coolant temperature sensor 141 measures a temperature of engine coolant. The engine oil temperature sensor 142 measures a temperature of engine oil. Alternatively, the engine coolant temperature sensor 141 and the engine oil temperature sensor 142 may be generally referred to as "an engine fluid temperature sensor," and the corresponding engine coolant temperature and engine oil temperature may be generally referred to as "an engine fluid temperature." In other words, either engine coolant temperature or engine oil temperature may be used.

The drive torque produced by the rotating crankshaft drivers the generator 144. The generator 144 generates current that may be supplied to the electric motor 108 and/or the battery system 112. More specifically, for example, in a charge-sustaining mode the generator 144 may maintain a predetermined amount of charge in the battery system 112, whereas in a charge-depleting mode the generator 144 may supply the electric motor 108 with current after the charge in the battery system 112 is depleted. In one embodiment, the electric motor 108 may be connected to the vehicle driveline via a transmission (not shown). Exhaust gas produced by combustion may be expelled from the cylinders 128 into an exhaust manifold 148. The exhaust gas may then be treated by an exhaust treatment system 152. For example, the exhaust treatment system 152 may include a catalytic converter.

The control module 160 regulates operation of the hybrid engine system 100. More specifically, the control module 160 may communicate with and/or control at least one of the battery system 112, the electric motor 108, the throttle 120, the fuel system 131, the fuel injectors 136, the spark plugs 140, and the generator 144. For example, the control module 160 may control torque output of the engine 104 by controlling airflow via the throttle 120, fuel supply via the fuel system 131 and the fuel injectors 136, spark via the spark plugs 140, and a gear ratio via the transmission (not shown).

Alternatively or additionally, for example, the control module 160 may control torque output of the electric motor 108 by controlling at least one of the battery system 112, the electric motor 108, and the generator 144. In one embodiment, the control module 160 may implement the system and method for engine and fuel system maintenance according to the present disclosure.

Figure 2:
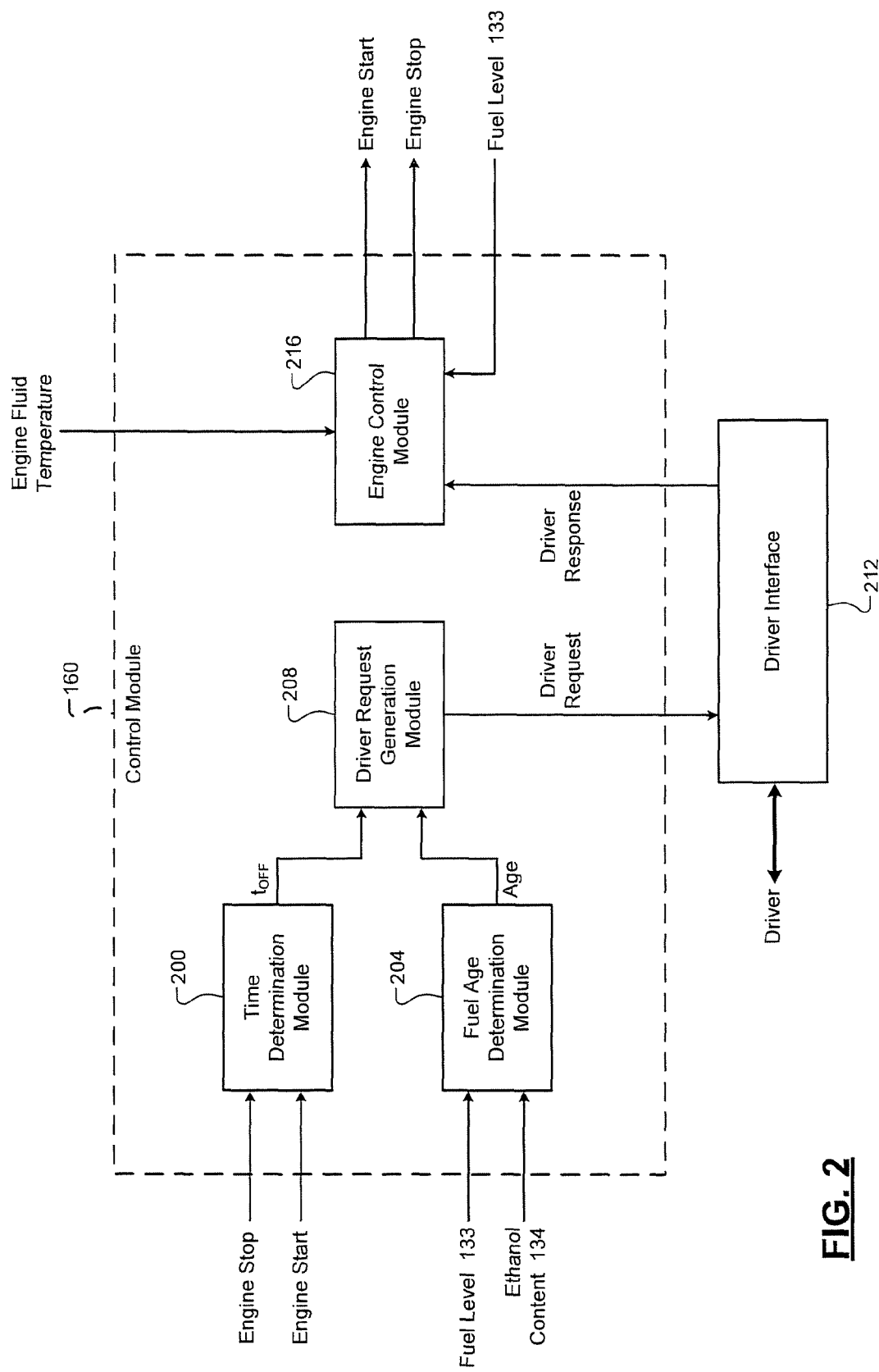
FIG. 2 is a functional block diagram of an exemplary control module according to the present disclosure.

Referring now to FIG. 2, the control module 160 is shown in more detail. The control module 160 may include a time determination module 200, a fuel age determination module 204, a driver request generation module 208, and an engine control module 216. The control module 160 may also communicate with a driver of the vehicle via a driver interface module 212. While the driver interface module 212 is depicted as an external module to the control module 160, the driver interface module 212 may also be located as part of the control module 160. Additionally, while the time determination module 200 and the fuel age determination module 204 are shown as part of the control module 160 of the engine 104, the time determination module 200 may be located partially in the control module 160 and partially in another module, such as a vehicle information and control module (VICM).

The time determination module 200 determines an engine off time. More specifically, the engine off time may indicate an amount of time that the engine 104 is stopped (i.e., off). In other words, for example, the engine off time may include a period when the electric motor 108 is propelling the vehicle and the engine 104 is off and/or a period when both the electric motor 108 and the engine 104 are off (i.e., the vehicle is garaged). For example, the time determination module 200 may determine the engine off time based on a period between an engine stop event and an engine start event (i.e., a timer). In other words, when the engine is not started the engine off time may include a difference between a present time and a time of a previous engine start operation (e.g., $t_{OFF} = (t_{present} - t_{previous}) + t_{OFF\_previous}$). For example, a free running timer (t) may be used, and thus $(t_{present} - t_{previous})$ may equal a time since a last power up. The engine off time may also be reset based on various operating conditions. For example, the engine off time may be reset when the engine is running (outside of an engine maintenance operation) and engine fluid temperature (e.g., $T_{coolant}$) exceeds a predetermined temperature ($T_{TH}$) for longer than a predetermined period. In other words, operating the engine at a high fluid temperature may be equivalent to an engine maintenance operation and thus the engine off time may be reset.

The fuel age determination module 204 determines an age of fuel in the fuel tank 132 of the engine 104. More specifically, the fuel age may be based on an amount of time since a previous refuel event and/or an ethanol content of the fuel. For example, the amount of time since the previous refuel event may be determined based on measurements from the fuel level sensor 133. In other words, when the amount of fuel in the fuel tank 132 remains constant or decreases (i.e., does not increase), the fuel age may increase.

When the amount of fuel in the fuel tank 132 increases, however, the fuel age may decrease (i.e., a refuel event). In one embodiment, the fuel age determination module 204 may determine the fuel age based on different ages of different fuel supplies. For example only, when the fuel in the fuel tank is ten days old and the fuel level is 70% and a refuel event occurs (i.e., an increase in the fuel level) that fills the fuel tank 132 to capacity, the fuel age may be seven days (e.g., [10 days×70%]+[0 days×30%]).

Additionally, for example, an increase in the ethanol content of the fuel may increase an aging rate of the fuel. In other words, adding ethanol to the fuel is not an immediate change in fuel age due to viscosity, but it does affect the aging rate of the fuel. Thus, the system and method may compensate for changes in ethanol content of the fuel when determining the fuel age. For example, the ethanol content of the fuel may be measured using the fuel composition sensor 134.

The driver request generation module 208 generates a request to start the engine 104. More specifically, the driver request generation module 208 may generate the driver request when one of the engine off time is greater than an engine off time threshold ($OFF_{TH}$) and the fuel age is greater than a fuel age threshold ($AGE_{TH}$). In one embodiment, the driver request generation module 208 may generate the driver request when both the engine off time is greater than the engine off time threshold $OFF_{TH}$ and the fuel age is greater than the fuel age threshold $AGE_{TH}$.

The engine off time threshold $OFF_{TH}$ may also be adjusted based on various operating conditions. More specifically, the engine off time threshold $OFF_{TH}$ may be adjusted when a low fuel delay is present before an engine maintenance request is initiated. In other words, the low fuel delay may inhibit the engine maintenance request for a calibratable amount of time to give the driver a longer opportunity to refill the fuel tank. For example, the driver may also be sent a warning message to refuel before a required engine maintenance operation. Additionally or alternatively, the engine off time threshold $OFF_{TH}$ may be adjusted if the vehicle is off when the engine off time equals the engine off time threshold $OFF_{TH}$, and the driver subsequently starts the vehicle on a number of days after the default criteria has been met (e.g., X days). Thus, the engine off time threshold $OFF_{TH}$ may be adjusted by X days (i.e., $OFF_{TH} = OFF_{TH} + X$). In other words, extending the engine off time threshold $OFF_{TH}$ may prevent an engine maintenance operation from being initiated without first warning the driver.

The fuel age threshold $AGE_{TH}$ may also be adjusted based on various operating conditions. More specifically, the fuel age threshold $AGE_{TH}$ may be adjusted when a low fuel delay is present before a fuel maintenance request is to be initiated. In other words, the low fuel delay may inhibit the fuel maintenance request for a calibratable amount of time to give the driver a longer opportunity to refill the fuel tank. Additionally or alternatively, the fuel age threshold $AGE_{TH}$ may be adjusted if the vehicle is off when the fuel age equals the fuel age threshold $AGE_{TH}$, and the driver subsequently starts the vehicle on a number of days after the default criteria have been met (e.g., X days). Thus, the fuel age threshold $AGE_{TH}$ may be adjusted by X days (e.g., $AGE_{TH} = AGE_{TH} + X$). In other words, extending the fuel age threshold $AGE_{TH}$ may prevent a fuel maintenance operation from being initiated without first warning the driver. Additionally or alternatively, the fuel age threshold $AGE_{TH}$ may be adjusted when an engine maintenance request is initiated within a calibratable period of a fuel maintenance request. The fuel age threshold $AGE_{TH}$ may be decreased to equal the current fuel age to give the fuel maintenance request priority. In other words, fuel maintenance operations have priority over engine maintenance operations because fuel maintenance operations normally take longer (e.g., until fuel runs out). Moreover, engine maintenance operations may be fulfilled during a fuel maintenance operation because fuel maintenance operations are typically longer.

The driver request generation module 208 may also generate more than one driver request. For example, the driver request generation module 208 may generate the driver request periodically after one of the engine off time and the fuel age reach the corresponding thresholds $OFF_{TH}$ and AGE$_{TH}$, respectively. In other words, these repeated requests may include warnings that an engine start operation may be required soon.

The driver interface module 212 communicates between the driver of the vehicle and the control module 160. More specifically, the driver interface module 212 communicates the request(s) to start the engine 104 to the driver. For example, the request to the driver may be visual and/or audible. The driver may then respond to the request by communicating a response to the control module 160 via the driver interface module 212. More specifically, the driver may generate a driver response using the driver interface module 212. For example, the driver may generate the driver response using a button, a touchpad, or a touch screen.

The engine control module 216 controls activation and deactivation of the engine 104. More specifically, the engine control module 216 may start the engine 104 when the driver response affirms the request to start the engine 104. For example, the engine control module 216 may generate an engine start signal that is received by an ignition controller (not shown). Alternatively, the engine control module 104 may not start the engine 104 when the driver ignores or disapproves of the request to start the engine 104. The engine control module 216, however, may start the engine 104 (regardless of the driver response) after the driver request has been ignored/disapproved (indicated by timer $t_{wait}$) for longer than a predetermined period ($t_{TH}$). In other words, the control module 160 may start the engine 104 without driver approval (i.e., a forced start). However, the engine control module 216 may not start the engine 104 (regardless of generated requests and driver responses) when the amount of fuel in the fuel tank 132 is less than a low fuel level threshold.

The engine control module 216 may then stop the engine 104 after engine fluid temperature is greater than the predetermined temperature threshold T$_{TH}$ for longer than the predetermined period. For example, the engine fluid temperature may be engine coolant temperature or engine oil temperature (e.g., measured by the engine coolant temperature sensor 141 and the engine oil temperature sensor 142, respectively). Additionally, for example, the engine control module 216 may stop the engine 104 by generating an engine stop signal. The engine control module 216 may also stop the engine 104 when the amount of fuel in the fuel tank 132 falls below the low fuel level threshold. In other words, the engine control module 216 may stop the engine 104 to prevent the fuel tank 132 from depleting (and thus possibly stranding the driver if the battery system 112 were to run out of power too). However, after a predetermined period has elapsed, the engine control module 216 may also allow the engine 104 to run until the fuel tank 132 is depleted, after which the battery system 112 and the electric motor 108 may be used to propel the vehicle in a "reduced power" mode until a refuel event occurs. After a refuel event occurs, the engine control module 216 may restart the engine 104 until the engine fluid temperature is greater than the predetermined temperature threshold T$_{TH}$ for the predetermined period.

Figure 3:
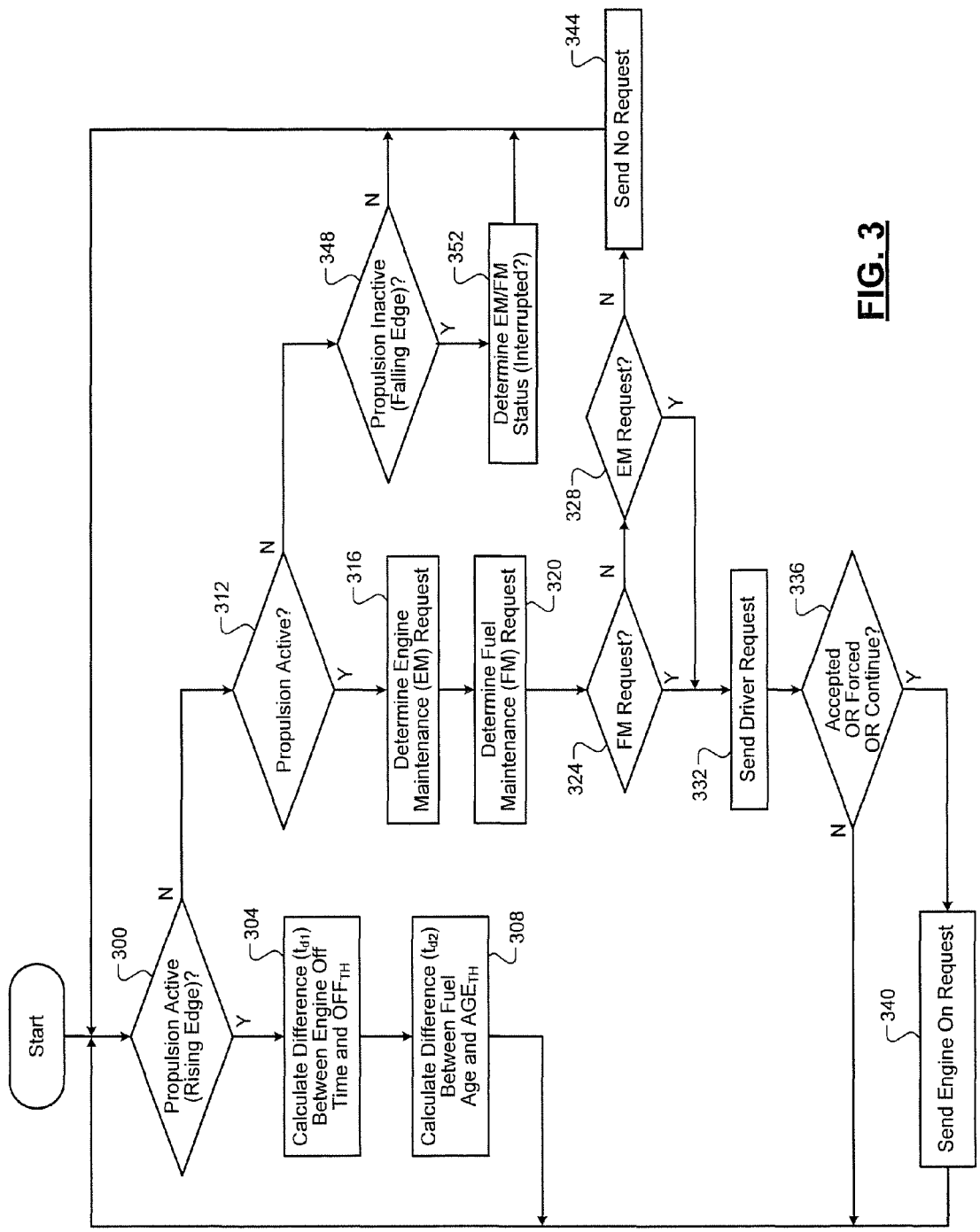
FIG. 3 is a flow diagram of an exemplary method for engine and fuel system maintenance according to the present disclosure.

Referring now to FIG. 3, a method for operating an engine system incorporating engine and fuel system maintenance according to the present disclosure begins at 300. At 300, the control module 160 determines whether the propulsion system of the vehicle has been activated. More specifically, the control module 160 detects a rising edge of a signal indicating that the propulsion system is active. If true, control may proceed to 304. If false, control may proceed to 312.

At 304, the control module 160 calculates a difference ($t_{d1}$) between the engine off time and the engine off time threshold OFF$_{TH}$. At 308, the control module 160 calculates a difference ($t_{d2}$) between the fuel age and the fuel age threshold AGE$_{TH}$. Control may then return to 300.

At 312, the control module 160 determines whether the propulsion system is active. In other words, the control module 160 detects whether the signal indicating that the propulsion system is active is constant (i.e., not a rising or falling edge). If true, control may proceed to 316. If false, control may proceed to 348.

At 316, the control module 160 determines whether engine maintenance is required. At 320, the control module 160 determines whether fuel system maintenance is required. In other words, if engine maintenance and/or fuel system maintenance are required, then a request may be generated. 316 and 320 are also illustrated in more detail in FIGS. 4A and 4B, respectively, and described in more detail later.

At 324, the control module 160 determines whether fuel system maintenance is requested. If true, control may proceed to 332. If false, control may proceed to 328. In 328, the control module 160 determines whether engine maintenance is required. If true, control may proceed to 332. If false, control may proceed to 344. In other words, fuel system maintenance operations have priority over engine maintenance operations because they are longer (and also likely fulfill the engine maintenance operation at the same time).

At 332, the control module 160 sends a request to the driver of the vehicle to start the engine 104. At 336, the control module 160 determines whether the driver accepted the request. The control module 160, however, may also continue automatically if a previous maintenance cycle was interrupted or the control module 160 may force the start operation after the driver has ignored the request for a predetermined period. For example, a interruption flag may be set (and stored in the NVM) when a previous maintenance cycle was incomplete. Thus, if the driver accepts the request, if the control module 160 automatically continues due to a previously incomplete maintenance cycle, or if the control module 160 forces acceptance of the request, control may proceed to 340. If false, control may return to 300.

At 340, the control module 160 may send the engine on request and start the engine 104. At 344, the control module 160 may generate no request. In other words, neither engine maintenance nor fuel system maintenance may be required. Control may then return to 300.

At 348, the control module 160 determines whether the propulsion system of the vehicle has been deactivated. More specifically, the control module 160 detects a falling edge of the signal indicating that the propulsion system is active (i.e., transitioning to inactive). If true, control may proceed to 352. If false, control may return to 300.

At 352, the control module 160 may determine a status of engine maintenance or fuel system maintenance operation. In other words, the control module 160 may determine whether the operation was interrupted during a previous cycle. For example, the control module 160 may set the interrupted flag if the operation was interrupted. Control may then return to 300.

Figure 4A:
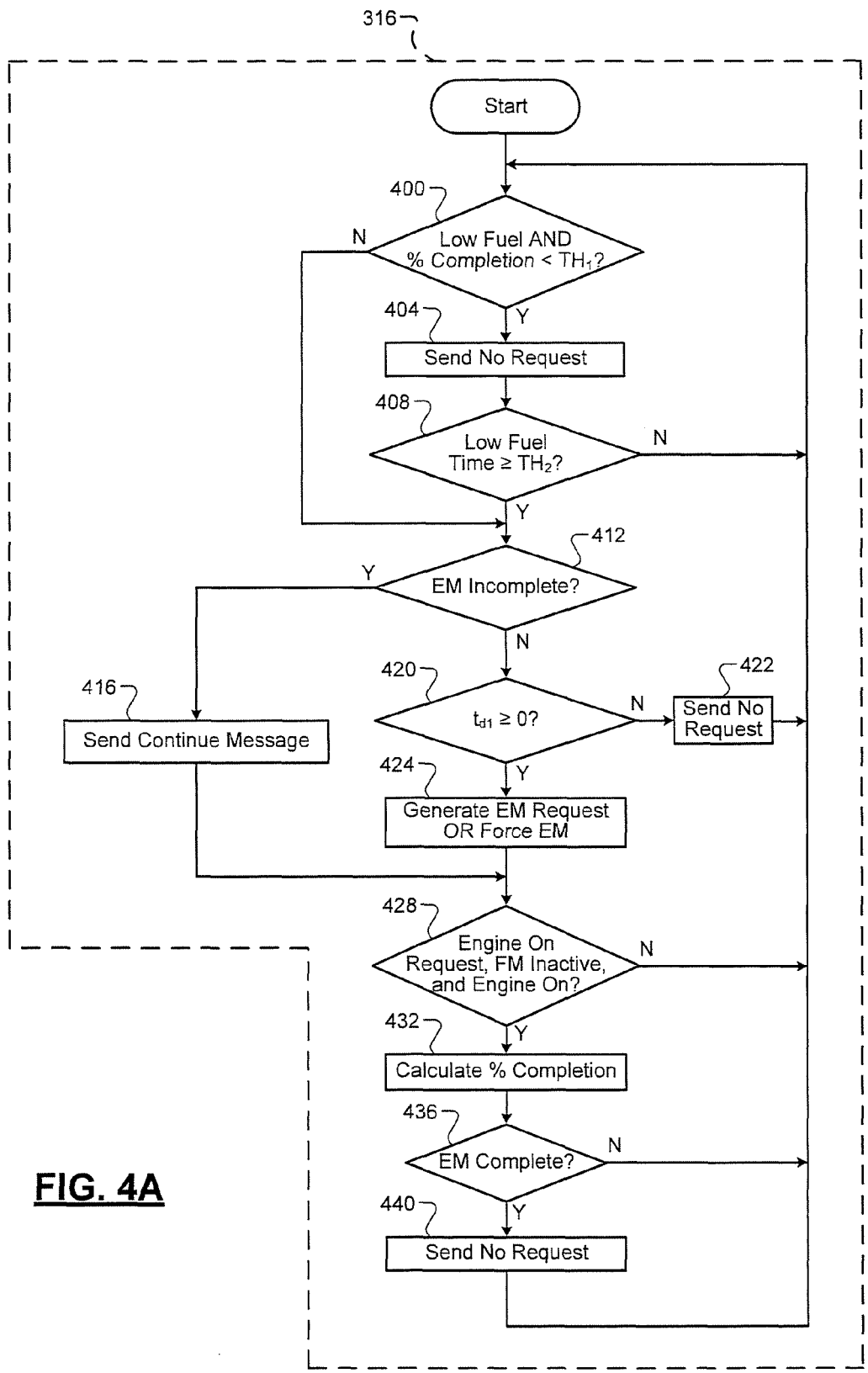
FIG. 4A is a flow diagram of an exemplary method for determining whether engine maintenance is required according to the present disclosure.

Referring now to FIG. 4A, 316 is shown in more detail. Rather, FIG. 4A illustrates a method for determining whether engine maintenance is required. The method begins in 400. At 400, the control module 160 determines whether the fuel level is less than a predetermined threshold ("low fuel") and whether a current engine maintenance operation is less than a predetermined percentage (TH$_1$) complete. In other words, the control module 160 may wait for a current engine maintenance operation to complete if a low fuel condition is reached during an engine maintenance operation. If both are true, control may proceed to 404. Otherwise, control may proceed to 412.

At 404, the control module 160 may send no request for engine maintenance. At 408, the control module 160 may determine whether the fuel level has been below the predetermined threshold ("low fuel time") for greater than a predetermined period (TH$_2$). If true, control may proceed to 412. If false, control may return to 400.

At 412, the control module 160 may determine whether the current engine maintenance operation is incomplete. If true, control may proceed to 416. If false, control may proceed to 420. At 416, the control module 160 sends a continue message to inform the driver of a subsequent engine maintenance operation. At 420, the control module 160 determines whether the difference $t_{d1}$ between the engine off time and the engine off time threshold OFF$_{TH}$ is greater than or equal to zero. In other words, the control module 160 determines whether the engine off time has exceeded the engine off time threshold OFF$_{TH}$. If true, control may proceed to 424. If false, control may proceed to 422. At 422, the control module 160 may send no request to the driver of the vehicle because the engine off time has not yet exceeded the engine off time threshold OFF$_{TH}$. Control may then return to 400.

At 424, the control module 160 may generate an engine maintenance request. Alternatively, the control module 160 may force an engine maintenance operation if the driver has ignored previous requests. At 428, the control module 160 determines whether an engine on request has been generated, fuel maintenance is inactive, and the engine 104 is on. If all are true, control may proceed to 432. Otherwise, control may return to 400.

At 432, the control module 160 determines the percentage completion of the current engine maintenance operation. For example, the percentage completion may be calculated as follows:

$$\% \; EM \; Completion = \frac{t_{EM}}{t_{EM} + t_{cal} + t_{offset}}, \quad (1)$$

where $t_{EM}$ is a run time of the current engine maintenance operation, $t_{cal}$ is a calibratable time based on engine fluid temperature (e.g., T$_{coolant}$), and $t_{offset}$ is an offset time after reaching the desired temperature T$_{des}$. As engine fluid temperature (e.g., T$_{coolant}$) increases, $t_{cal}$ eventually reaches zero and the countdown offset timer $t_{offset}$ is triggered to ensure that the engine 104 has operated above the desired operating temperature T$_{des}$ for a specific period. Once $t_{offset}$ counts down and reaches zero, the engine maintenance operation has completed (i.e., $t_{EM}/t_{EM}$=100%). Additionally, $t_{offset}$ may be increased during cold start operations. More specifically, $t_{offset}$ may be increased by a calibratable amount that is based on the engine fluid temperature (e.g., T$_{coolant}$) and stored in a look-up table.

However, if the run time $t_{EM}$ reaches a limit or the engine fluid temperature sensor (e.g., engine coolant temperature sensor 141 or engine oil temperature sensor 142) has faulted, the percentage completion may be calculated as follows:

$$\% \; EM \; Completion = \frac{t_{EM}}{t_{max}}, \quad (2)$$

where $t_{EM}$ is the run time of the current engine maintenance operation and $t_{max}$ is a maximum time limit. Additionally, for example, progress of and completion of the current engine maintenance operation may be tracked based on a number of engine cycles (i.e., as opposed to time).

At 436, the control module 160 determines whether the current engine maintenance operation has completed. If true, control may proceed to 440. If false, control may return to 400. At 440, the control module 160 may send no maintenance request to the driver of the vehicle because the prior engine maintenance operation successfully completed. Control may then return to 400.

Figure 4B:
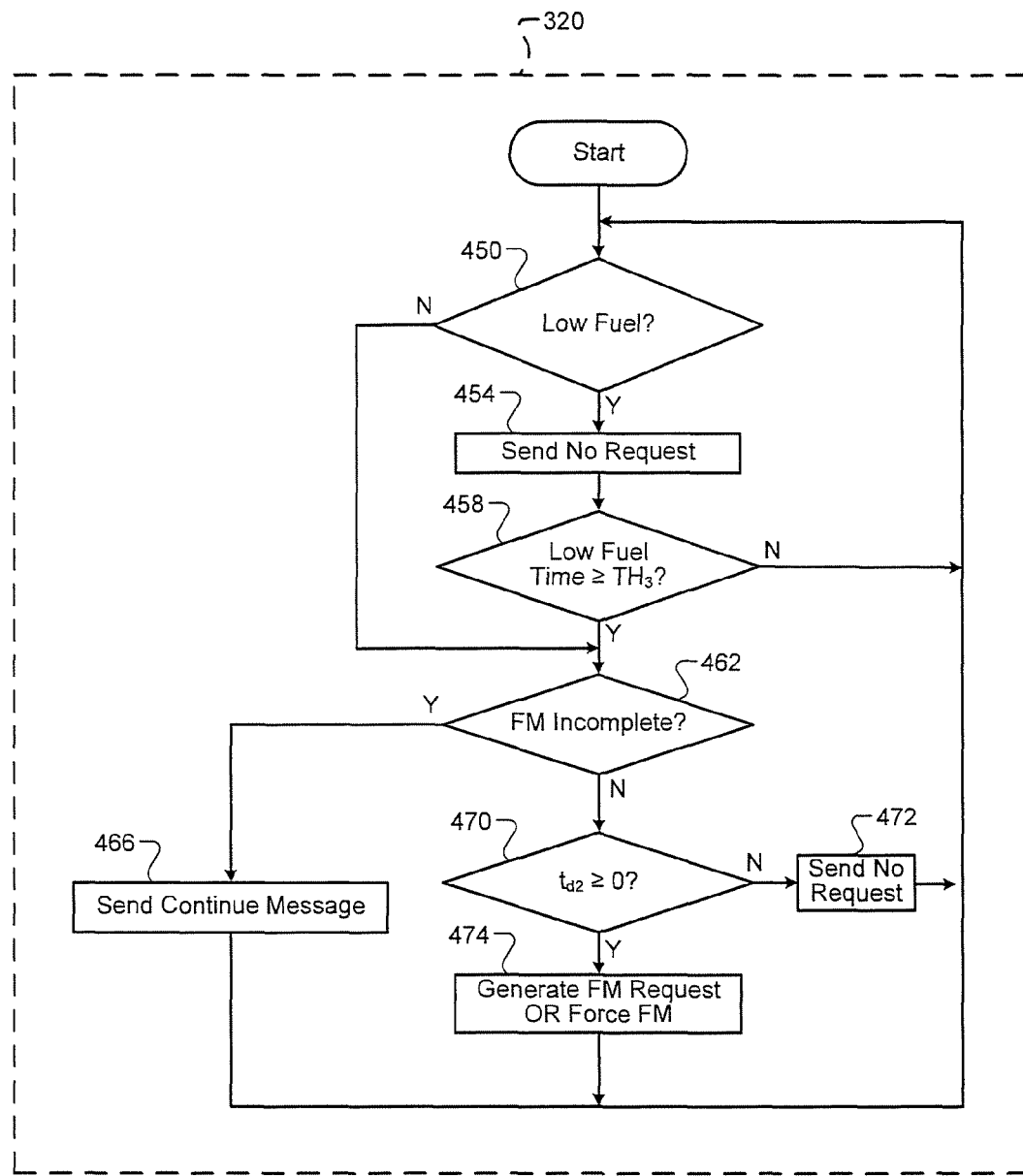
FIG. 4B is a flow diagram of an exemplary method for determining whether fuel system maintenance is required according to the present disclosure.

Referring now to FIG. 4B, 320 is shown in more detail. Rather, FIG. 4B illustrates a method for determining whether fuel maintenance is required. The method begins at 450. At 450, the control module 160 determines whether the fuel level is less than a predetermined threshold ("low fuel"). If true, control may proceed to 454. Otherwise, control may proceed to 462. At 454, the control module 160 may send no request for fuel maintenance to give the driver an opportunity to refuel.

At 458, the control module 160 may determine whether the fuel level has been below the predetermined threshold ("low fuel time") for greater than a predetermined period (TH$_3$). For example only, predetermined period TH$_3$ may be equal to predetermined period TH$_2$ (see FIG. 4A). If true, control may proceed to 462. If false, control may return to 450. At 462, the control module 160 may determine whether the current fuel maintenance operation is incomplete. If true, control may proceed to 466. If false, control may proceed to 470. At 466, the control module 160 sends a continue message to allow for a subsequent fuel maintenance operation and control may return to 450.

At 470, the control module 160 determines whether the difference $t_{d2}$ between the fuel age and the fuel age threshold AGE$_{TH}$ is greater than or equal to zero. In other words, the control module 160 determines whether the fuel age has exceeded the fuel age threshold AGE$_{TH}$. If true, control may proceed to 474. If false, control may proceed to 472. At 472, the control module 160 may send no request to the driver of the vehicle because the fuel age may have decreased after a refuel event, and thus the request is effectively cleared. Control may then return to 450. At 474, the control module 160 may generate a fuel maintenance request. Alternatively, the control module 160 may force a fuel maintenance operation if the driver has ignored previous requests. Control may return to 450.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, comprising:
a time determination module that determines an engine off time, wherein the engine off time indicates an amount of time that an engine is off;
a fuel age determination module that determines an age of fuel in a fuel system of the engine;
a driver request generation module that generates a request for a driver of the vehicle to allow the engine to start when one of the engine off time is greater than a predetermined time threshold and the age of the fuel is greater than a predetermined age threshold; and
an engine control module that starts the engine when the driver affirms the request, wherein the predetermined age threshold is increased when a low fuel delay is present before a fuel maintenance request is to be initiated, wherein the predetermined age threshold is increased by X days if the vehicle is off when the fuel age equals the predetermined age threshold and the driver subsequently starts the vehicle X days later and default criteria have been met, and wherein the predetermined age threshold is decreased to equal a current fuel age when an engine maintenance request is initiated within a calibratable period of a fuel maintenance request.

2. A method, comprising:

determining an engine off time, wherein the engine off time indicates an amount of time that an engine is off;

determining an age of fuel in a fuel system of the engine;

generating a request for a driver of a vehicle to allow the engine to start when one of the engine off time is greater than a predetermined time threshold and the age of the fuel is greater than a predetermined age threshold;

starting the engine when the driver affirms the request;

increasing the predetermined age threshold when a low fuel delay is present before a fuel maintenance request is to be initiated;

increasing the predetermined age threshold by X days if the vehicle is off when the fuel age equals the predetermined age threshold and the driver subsequently starts the vehicle X days later and default criteria have been met; and decreasing the predetermined age threshold to equal a current fuel age when an engine maintenance request is initiated within a calibratable period of a fuel maintenance request.

3. A control system for a vehicle, comprising:

a time determination module that determines an engine off time, wherein the engine off time indicates an amount of time that an engine is off;

a fuel age determination module that determines an age of fuel in a fuel system of the engine; and an engine control module that starts the engine when one of the engine off time is greater than a predetermined time threshold and the age of the fuel is greater than a predetermined age threshold, wherein the predetermined age threshold is increased when a low fuel delay is present before a fuel maintenance request is to be initiated, wherein the predetermined age threshold is increased by X days if the vehicle is off when the fuel age equals the predetermined age threshold and the driver subsequently starts the vehicle X days later and default criteria have been met, and wherein the predetermined age threshold is decreased to equal a current fuel age when an engine maintenance request is initiated within a calibratable period of a fuel maintenance request.

4. The control system of claim 3, wherein the engine control module stops the engine a first predetermined period after starting the engine.

5. The control system of claim 4, wherein the engine control module stops the engine when an engine fluid temperature is greater than a predetermined temperature threshold for a second predetermined period.

6. The control system of claim 5, wherein the engine off time is set to zero when the engine fluid temperature is greater than or equal to a desired operating temperature for a period of time.

7. The control system of claim 6, wherein the engine fluid temperature is one of engine coolant temperature and engine oil temperature.

8. The control system of claim 3, wherein the fuel age determination module determines the age of the fuel based on an amount of time since a previous refuel event.

9. The control system of claim 8, wherein the fuel age determination module determines the age of the fuel based on an ethanol content of the fuel.

10. The control system of claim 3, wherein the fuel age determination module decreases the age of the fuel when a refuel event occurs.

11. The control system of claim 3, wherein the predetermined time threshold is increased when a low fuel delay is present before an engine maintenance request is initiated, and wherein the predetermined time threshold is increased by Y days if the vehicle is off when the engine off time equals the predetermined time threshold and the driver subsequently starts the vehicle Y days later and default criteria have been met, wherein Y is greater than or equal to zero.

12. The control system of claim 3, wherein a completion percentage of a current maintenance operation is determined and visually displayed to the driver of the vehicle, wherein the completion percentage is determined based on one of:

a current run time of the current maintenance operation, a calibratable time based on engine fluid temperature, and an offset time, wherein the calibratable time reaches zero and the offset time is triggered and begins to countdown when the engine fluid temperature reaches a desired operating temperature; and the current run time of the current maintenance operation and a maximum run time limit when one of the run time reaches a limit and an engine fluid temperature sensor has failed.

13. The control system of claim 12, wherein progress and completion percentage of the current maintenance operation are determined based on a number of engine cycles.

14. The control system of claim 12, wherein the offset time is increased by a calibratable amount during cold start operations, wherein the calibratable amount is one of a plurality of values based on the engine fluid temperature and stored in a look-up table.

15. The control system of claim 14, wherein the engine fluid temperature is one of engine coolant temperature and engine oil temperature, and wherein the engine fluid temperature sensor is one of an engine coolant temperature sensor and an engine oil temperature sensor.

16. The control system of claim 3, further comprising at least one of:

a first failsafe module that, when one of an engine coolant temperature sensor and an engine oil temperature sensor fails, runs engine maintenance until a maximum calibration time expires;

a second failsafe module that, when a fuel level sensor fails, runs engine or fuel maintenance with the fuel level sensor failure by ignoring low fuel levels, increasing fuel age as normal, and not detecting refuel events;

a third failsafe module that, when a fuel composition sensor fails, commands a default fuel aging rate to maximum rate of fuel aging corresponding to pure ethanol; and a fourth failsafe module that, when non-volatile memory (NVM) fails, sets the fuel age and the engine off time to calibrated values such that time does not start accumulating from zero if the vehicle was within a predetermined period of needing at least one of engine maintenance and fuel maintenance.

17. The control system of claim 3, further comprising:
a driver request generation module that generates a request for a driver of the vehicle to allow the engine to start.

18. The control system of claim 17, wherein the driver request generation module generates the request when one of the engine off time is greater than the predetermined time threshold and the age of the fuel is greater than the predetermined age threshold.

19. The control system of claim 18, further comprising:
a driver interface module that sends the request to the driver, and that receives a response to the request from the driver.

20. The control system of claim 19, wherein the engine control module starts the engine when the driver response affirms the request.

21. A method, comprising:
determining an engine off time, wherein the engine off time indicates an amount of time that an engine is off;
determining an age of fuel in a fuel system of the engine;
increasing a predetermined age threshold when a low fuel delay is present before a fuel maintenance request is to be initiated;
increasing the predetermined age threshold by X days if the vehicle is off when the fuel age equals the predetermined age threshold and the driver subsequently starts the vehicle X days later and default criteria have been met;
decreasing the predetermined age threshold to equal a current fuel age when an engine maintenance request is initiated within a calibratable period of a fuel maintenance request; and
starting the engine when one of the engine off time is greater than a predetermined time threshold and the age of the fuel is greater than the predetermined age threshold.

22. The method of claim 21, further comprising:
stopping the engine a first predetermined period after starting the engine.

23. The method of claim 22, further comprising:
stopping the engine when an engine fluid temperature is greater than a predetermined temperature threshold for a second predetermined period.

24. The method of claim 23, further comprising:
setting the engine off time to zero when the engine fluid temperature is greater than or equal to a desired operating temperature for a period of time.

25. The method of claim 24, wherein the engine fluid temperature is one of engine coolant temperature and engine oil temperature.

26. The method of claim 21, further comprising:
determining the age of the fuel based on an amount of time since a previous refuel event.

27. The method of claim 21, further comprising:
determining the age of the fuel based on an ethanol content of the fuel.

28. The method of claim 21, further comprising:
decreasing the age of the fuel when a refuel event occurs.

29. The method of claim 21, further comprising:
increasing the predetermined time threshold when a low fuel delay is present before an engine maintenance request is initiated; and
increasing the predetermined time threshold by Y days if the vehicle is off when the engine off time equals the predetermined time threshold and the driver subsequently starts the vehicle Y days later and default criteria have been met, wherein Y is greater than or equal to zero.

30. The method of claim 21, further comprising:
determining a completion percentage of a current maintenance operation and visually displaying the completion percentage to the driver of the vehicle, wherein the determining the completion percentage of the current maintenance operation is further based on one of:
a current run time of the current maintenance operation, a calibratable time based on engine fluid temperature, and an offset time, wherein the calibratable time reaches zero and the offset time is triggered and begins to countdown when the engine fluid temperature reaches a desired operating temperature; and
the current run time of the current maintenance operation and a maximum run time limit when one of the run time reaches a limit and an engine fluid temperature sensor has failed.

31. The method of claim 30, wherein progress and completion percentage of the current maintenance operation are determined based on a number of engine cycles.

32. The method of claim 30, further comprising:
increasing the offset time by a calibratable amount during cold start operations, wherein the calibratable amount is one of a plurality of values based on the engine fluid temperature and stored in a look-up table.

33. The method of claim 32, wherein the engine fluid temperature is one of engine coolant temperature and engine oil temperature, and wherein the engine fluid temperature sensor is one of an engine coolant temperature sensor and an engine oil temperature sensor.

34. The method of claim 21, further comprising at least one of:
when one of an engine coolant sensor and an engine oil sensor fails, running engine maintenance until a maximum calibration time expires;
when a fuel level sensor fails, running engine or fuel maintenance with the fuel level sensor failure by ignoring low fuel levels, increasing fuel age as normal, and not detecting refuel events;
when a fuel composition sensor fails, commanding a default fuel aging rate to maximum rate of fuel aging corresponding to pure ethanol; and
when non-volatile memory (NVM) fails, setting the fuel age and the engine off time to calibrated values such that time does not start accumulating from zero if the vehicle was within a predetermined period of needing at least one of engine maintenance and fuel maintenance.

35. The method of claim 21, further comprising:
generating a request for a driver of a vehicle to allow the engine to start.

36. The method of claim 35, further comprising:
generating the request when one of the engine off time is greater than the predetermined time threshold and the age of the fuel is greater than the predetermined age threshold.

37. The method of claim 36, further comprising:
sending the request to the driver; and
receiving a response to the request from the driver.

38. The method of claim 37, further comprising:
starting the engine when the driver response affirms the request.

* * * * *